United States Patent [19]
Hill et al.

[11] Patent Number: 5,787,424
[45] Date of Patent: Jul. 28, 1998

[54] PROCESS AND SYSTEM FOR RECURSIVE DOCUMENT RETRIEVAL

[75] Inventors: Joe R. Hill, Austin; Gregory J. Thompson, Round Rock, both of Tex.

[73] Assignee: Electronic Data Systems Corporation, Plano, Tex.

[21] Appl. No.: 565,535

[22] Filed: Nov. 30, 1995

[51] Int. Cl.$^6$ ...................................................... G06F 17/00
[52] U.S. Cl. .......................... 707/6; 707/3; 707/5; 707/6; 707/7; 707/531
[58] Field of Search ........................... 395/600, 601–623; 707/1–7, 100–101, 530, 531, 536; 704/1, 2, 231; 364/578, 724.17, 724.2, 725.01

[56] References Cited

U.S. PATENT DOCUMENTS

| | | | |
|---|---|---|---|
| 5,140,692 | 8/1992 | Morita | 395/600 |
| 5,162,992 | 11/1992 | Williams | 364/419 |
| 5,168,565 | 12/1992 | Morita | 395/600 |
| 5,237,678 | 8/1993 | Kuechler et al. | 395/600 |
| 5,297,042 | 3/1994 | Morita | 364/419.19 |
| 5,301,109 | 4/1994 | Landauer et al. | 734/291 |
| 5,317,507 | 5/1994 | Gallant | 364/419.13 |
| 5,325,298 | 6/1994 | Gallant | 364/419.19 |
| 5,388,259 | 2/1995 | Fleischman et al. | 395/600 |
| 5,488,725 | 1/1996 | Turtle et al. | 395/600 |
| 5,546,570 | 8/1996 | McPherson, Jr. et al. | 395/600 |
| 5,546,571 | 8/1996 | Shan et al. | 395/600 |
| 5,577,241 | 11/1996 | Spencer | 395/605 |

OTHER PUBLICATIONS

Hill, Joe R. and Tsai, Chih–Ling, Calculating the Efficiency of Maximum Quasilikelihood Estimation, Appl. Stat. vol. 37, No. 2, 1988.

van Rijsbergen, C.J., Information Retrieval, Depar.t of Computer Science, University College, Dublin, 1975.

Fuhr, Norbert and Chris Buckley, A Probabilistic Learning Approach for Document Indexing, ACM Transactions on Information Systems, vol. 9, No. 3, Jul. 1991, pp. 223–248.

Turtle, Howard and W. Bruce Croft, Evaluation of an Inference Network–Based REtrieval Model, ACM Transactions on Information Systems, vol. 9, No. 3, Jul. 1991, pp. 187–222.

*Primary Examiner*—Thomas G. Black
*Assistant Examiner*—David Yiuk Jung
*Attorney, Agent, or Firm*—Anthony E. Peterman; L. Joy Griebenow

[57] ABSTRACT

A system (10) for recursive document retrieval is provided. An original repository (12) comprises a plurality of documents (14), and a query (16) comprises information by which the original repository (12) can be analyzed to identify relevant documents (14). A retrieval engine (18) is coupled to the original repository (12) and receives the query (16). The retrieval engine (18) is operable to execute an automatic recursive retrieval process with respect to the original repository (12) using the query (16) where the automatic recursive retrieval process comprises a plurality of iterations. The retrieval engine (18) is also operable to provide as system output a retrieved repository (28) comprising a plurality of documents (30) from the original repository (12) identified as sufficiently relevant to the query (16) according to the automatic recursive retrieval process for detection as relevant documents.

19 Claims, 2 Drawing Sheets

PROCESS AND SYSTEM FOR RECURSIVE DOCUMENT RETRIEVAL

TECHNICAL FIELD OF THE INVENTION

This invention relates in general to the field of electronic systems, and more particularly to a system and process for recursive document retrieval.

BACKGROUND OF THE INVENTION

Given a large repository of documents, it can be desirable to search the repository in order to retrieve a subset of documents that are sufficiently relevant to a given query. Conventional systems for retrieving documents from within a repository generally focus on finding and identifying relevant documents rather than focusing on the elimination of non-relevant documents. This focus on relevant documents can produce problems where the repository has a relatively large number of documents in comparison to the number of documents that are relevant to the query. With respect to conventional retrieval systems, some allow repetitive searches, but the repetitive searches are limited and may include only tree-structure queries using similar retrieval methods at each level. Conventional retrieval systems do not adequately handle retrieval of relevant documents in the situation where the number of relevant documents is small in comparison with the overall size of the document repository being searched.

SUMMARY OF THE INVENTION

In accordance with the present invention, a process and system for recursive document retrieval are provided that substantially eliminate or reduce disadvantages and problems associated with previously developed document retrieval systems.

According to one embodiment of the present invention, a system for recursive document retrieval is provided. An original repository comprises a plurality of documents, and a query comprises information by which the original repository can be analyzed to identify relevant documents. A retrieval engine is coupled to the original repository and receives the query. The retrieval engine is operable to execute an automatic recursive retrieval process with respect to the original repository using the query where the automatic recursive retrieval process comprises a plurality of iterations. The retrieval engine is also operable to provide as system output a retrieved repository comprising a plurality of documents from the original repository identified as sufficiently relevant to the query according to the automatic recursive retrieval process for detection as relevant documents.

A technical advantage of the present invention is the specification of a retrieval system that can receive a query and perform recursive retrieval automatically without human intervention. Recursion can be applied to many conventional base retrieval methods and improve them by doing so. In addition, different detection methods can be used at different iterations in the process.

A technical advantage of the present invention is the provision of a retrieval system that allows automatic recursive retrieval with adaptation between iterations including modification of both training set and retrieval methods. For example, modification of training sets at each level of the recursive process allows the retrieval system to adapt to each iterative repository after it is generated. The automatic recursive retrieval can significantly improve precision without substantially degrading recall in a document retrieval system.

Another technical advantage of the present invention is the provision of a recursive retrieval system development tool to allow the modeling and implementation of such recursive document retrieval systems.

A further technical advantage of the present invention is the use of iterative steps to allow the discarding of irrelevant documents rather than the focus on relevant documents. Further, sorting of documents at each level is not critical, rather each document can be measured versus a threshold to determine whether or not it is irrelevant and should be discarded.

A technical advantage of one embodiment of the present invention is the use of an appropriate and comprehensive statistical model that properly accounts for different sources of information that contribute to accurate assessment of the relevance between two documents. Conventional probability based methods depend intrinsically on manual relevance judgments. In contrast, the present process does not require such manual relevance feedback in order to determine an appropriate measure of the relevance between two documents. In addition, human indexing of documents is replaced with much faster, automatic, and consistent statistically-based indexing.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein.

DETAILED DESCRIPTION OF THE INVENTION

Recursive document retrieval

Figure 1:
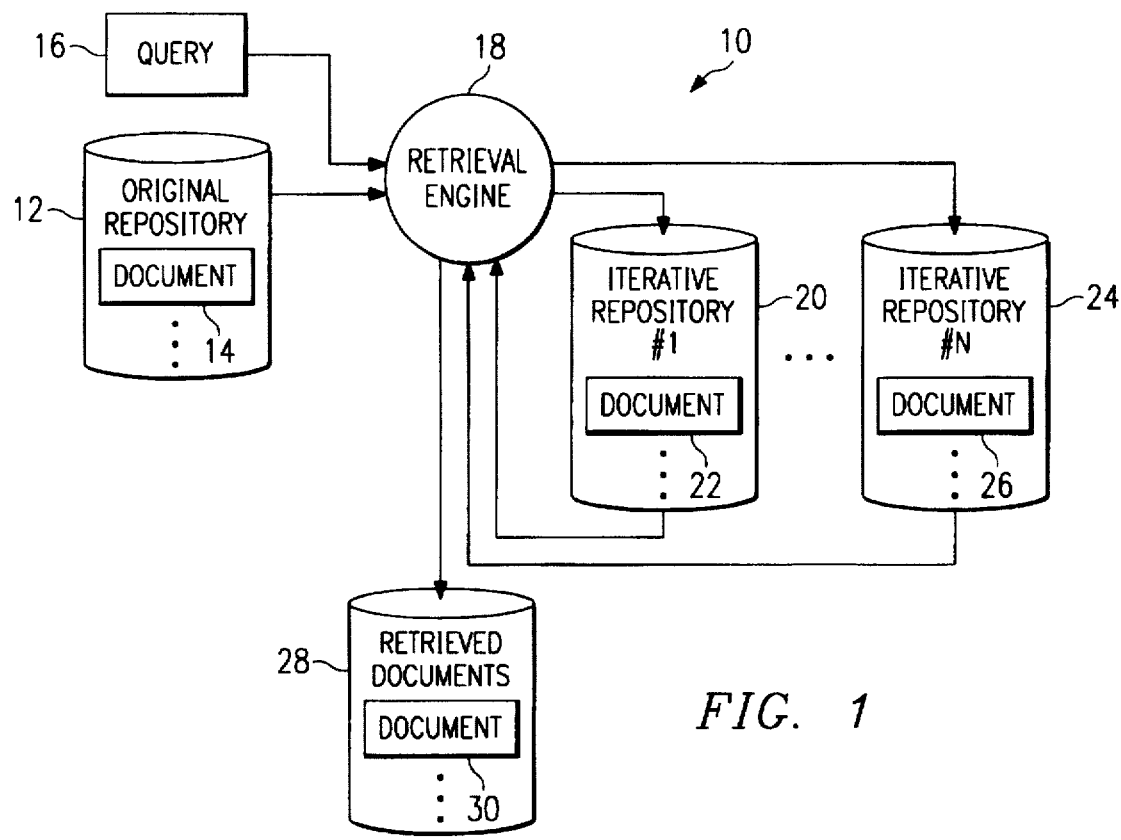
FIG. 1 is a block diagram of a recursive document retrieval system constructed according to the teachings of the present invention.

The present invention provides advantages through implementation of recursive retrieval to produce a retrieval system with good precision and good recall. FIG. 1 is a block diagram of a recursive document retrieval system, indicated generally at 10, constructed according to the teachings of the present invention. System 10 comprises an original repository 12 holding a plurality of documents 14 and comprises a query 16. In this embodiment, query 16 represents characteristics of relevant documents as specified by a user to system 10 and comprises information by which original repository 12 can be analyzed to identify relevant documents 14. Each document 14 and query 16 can comprise audio, video, image, text or other information or a combination thereof. In one embodiment of the present invention, documents 14 and query 16 comprise natural language text information.

A retrieval engine 18 receives query 16 and accesses original repository 12. Retrieval engine 18 is operable to execute a plurality of document retrieval steps. Retrieval engine 18 can generate a first iterative repository 20 which comprises a plurality of documents 22. Retrieval engine 18 also can generate up to an Nth iterative repository 24 which comprises a plurality of documents 26. The number of iterations can be implemented as appropriate for the desired application. At each iteration, the iterative repository produced by the previous iteration is used as a starting point to generate the next iterative repository. At the last iteration, retrieval engine 18 generates retrieved documents 28 which comprise a plurality of documents 30.

In operation, retrieval engine 18 processes query 16 and original repository 12 through a plurality of retrieval iterations to produce retrieved documents 28. As should be understood, documents 30 comprise a subset of documents 26 which in turn are a subset of documents 22. All of these documents are a subset of documents 14.

System 10 can be implemented on a computer system comprising a storage device, memory and a processor. In one such embodiment, original repository 14 is stored by the storage device. Query 16 and iterative repositories 20 to 24 are stored by the memory. Retrieved documents 28 are stored by the storage device. The processor operates under the control of software to execute each iteration of the recursive retrieval process.

Figure 2:
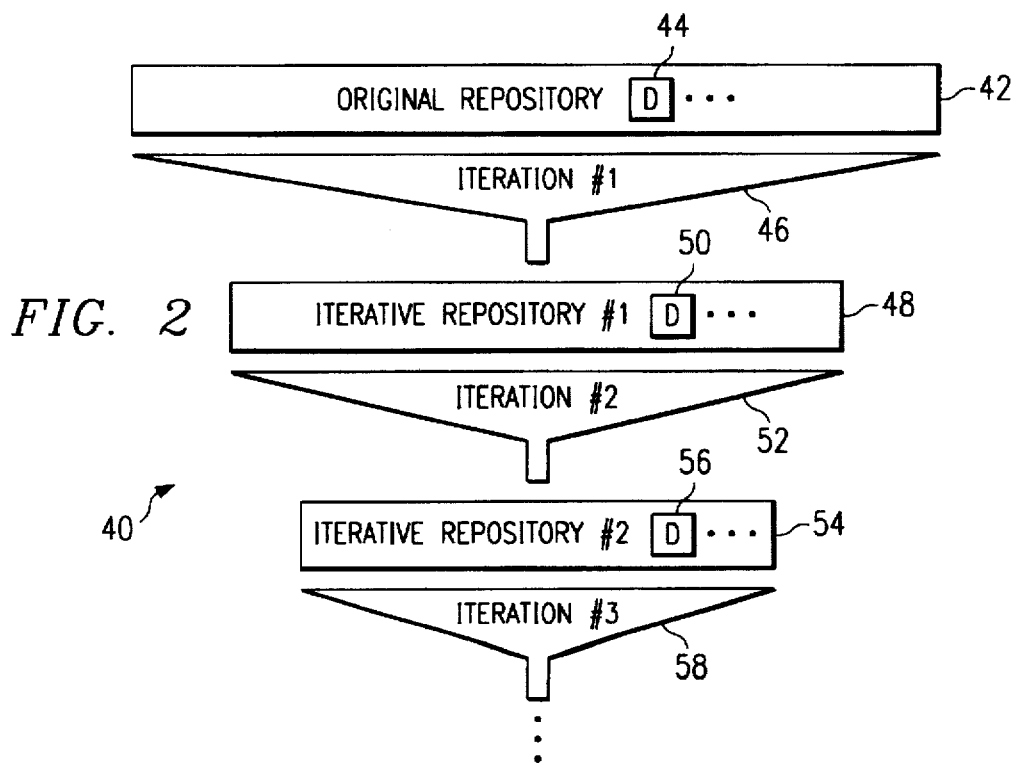
FIG. 2 is a schematic diagram of iterations in a recursive retrieval process according to the teachings of the present invention.

FIG. 2 is a schematic diagram of iterations in the recursive retrieval process performed by system 10 of FIG. 1. As shown, an original repository 42 comprises a plurality of documents 44. At a first iteration 46, a first retrieval process is performed on original repository 42. As a result of iteration 46, a first iterative repository 48 is created which comprises a plurality of documents 50. According to the teachings of the present invention, iterative repository 48 comprises those documents within original repository 42 that were not discarded as being irrelevant with respect to the query as processed by the retrieval process associated with iteration 46.

At a second iteration 52, a second retrieval process is performed on iterative repository 48 to produce a second iterative repository 54. Second iterative repository 54 comprises a plurality of documents 56.

Again, according to the teachings of the present invention, iterative repository 54 comprises those documents 56 from within iterative repository 48 that were not discarded as being irrelevant with respect to the query as processed by the retrieval process used in iteration 52.

At a third iteration 58, a third retrieval process is performed on iterative repository 54. The recursive retrieval process continues in this manner such that a desired number of iterations are performed until a set of retrieved documents has been generated.

As should be understood, the illustrated process is one of discarding irrelevant documents at each iteration as identified by the associated retrieval process. The retrieval processes chosen and used for iterations 46, 52 and 58 can be the same or different retrieval processes. In one embodiment of the present invention, the retrieval process used at each level uses a training set which is based upon and adapted to the specific repository of documents being processed. Thus, at each iteration, the training set would be modified to match the appropriate repository.

For example, in original repository 42, the phrase "neural network" may be rare with respect to the content of documents 44. Thus, if the query seeks documents in part relating to neural networks, iteration 46 may produce an iterative repository 48 that includes documents each having the words "neural network." As should be understood, the words "neural network" may no longer be important words for distinguishing documents 50 within iterative repository 48.

This is because most of documents 50 in iterative repository 48 were not discarded because they included content relevant to "neural network". The training set for iteration 52, because of this change in the characteristics of the repository, would no longer deem "neural network" to be an important or distinguishing feature of the documents. According to the teaching of the present invention, the training set can be adapted to each repository generated at the iterative steps.

The process of recursive retrieval is a technical advantage of the present invention. From an original document repository, the process would retrieve a first subset of documents. This subset of documents is then treated as the repository and a smaller subset of documents is identified. This smaller subset is, in turn, treated as the repository for identification of a smaller subset. This process solves a problem with conventional document retrieval methods that, if the repository of documents is large, then conventional retrieval systems with reasonably high recall suffer from low precision. These conventional systems suffer from this problem because, to have high recall, these systems retrieve a large number of documents, many of which are irrelevant.

The benefits of the recursive retrieval process of the present invention can be described as follows. The event R can be defined to be the event a document y is relevant to a query x, and $\neg R$ can be defined to be its complement. Let $D_t$ be the event that a document is detected on iteration t. It can be assumed that a document can be detected on iteration t only if it has been detected on iterations 1, ..., t−1; so, $D_t \subseteq D_{t-1}$ and $D_t = D_1 \cap \ldots \cap D_t$. For document retrieval, $\text{Recall}_t = p(D_t|R)$ and $\text{Precision}_t = p(R|D_t)$ can be defined to be the recall and precision at iteration t.

Given $p(R)$, $p(D_1|R)$, and $p(D_1|\neg R)$, the following can be calculated:

$$p(R|D_1) = \frac{p(R)p(D_1|R)}{p(D_1)},$$

$\text{Recall}_1 = p(D_1|R)$, and $\text{Precision}_1 = p(R|D_1)$, where:

$$p(D_1) = p(R)p(D_1|R) + p(\neg R)p(D_1|\neg R).$$

Then, given $p(R|D_1)$, $p(D_2|R \cap D_1)$, and $p(D_2|\neg R \cap D_1)$, the following can be calculated:

$$p(R|D_2) = \frac{p(R|D_1)p(D_2|R \cap D_1)}{p(D_2|D_1)}$$

$\text{Recall}_2 = p(D_2|R) = p(D_1|R)p(D_2|R \cap D_1)$, and $\text{Precision}_2 = p(R|D_2)$, where:

$$p(d_2|D_1) = p(R|D_1)p(D_2|R \cap D_1) + p(\neg R|D_1)p(D_2|\neg R \cap D_1).$$

Generalizing this concept, given $p(R|D_{t-1})$, $p(D_t|R \cap D_{t-1})$, and $p(D_t|\neg R \cap D_{t-1})$ it can be calculated that:

$$p(R|D_t) = \frac{p(R|D_{t-1})p(D_t|R \cap D_{t-1})}{p(D_t|D_{t-1})},$$

$\text{Recall}_t = p(D_t|R) = p(D_1|R) \ldots p(D_{t-1}|R \cap D_{t-2})p(D_t|R \cap D_{t-1})$, -continued and $$\text{Precision}_t = p(R|D_t),$$

where:

$$p(D_t|D_{t-1}) = p(R|D_{t-1})p(D_t|R \cap D_{t-1}) + p(\neg R|D_{t-1})p(D_t|\neg R \cap D_{t-1}).$$

Consequently, if $$p(D_t|R \cap D_{t-1}) > p(D_t|\neg R \cap D_{t-1}),$$

which is usually the case, then $\text{Precision}_t > \text{Precision}_{t-1}$. But the fact that:

$$p(D_t|R \cap D_{t-1}) < 1,$$

which is usually the case, implies that:

$$\text{Recall}_t < \text{Recall}_{t-1}.$$

Good systems will have $$p(D_t|\neg R \cap D_{t-1}) \approx 0$$

and $$p(D_t|R \cap D_{t-1}) \approx 1,$$

in which case $\text{Precision}_t$ will increase substantially with little penalty to Recall, during each iteration of a recursive retrieval process.

For example, if $$p(D_t|\neg R \cap D_{t-1}) = 0.01$$

and $$p(D_t|R \cap D_{t-1}) = 0.99,$$

then, $$\text{Precision}_t = \frac{0.99 \text{Precision}_{t-1}}{0.99 \text{Precision}_{t-1} + 0.01(1 - \text{Precision}_{t-1})}$$

and $$\text{Recall}_t = 0.99 \text{Recall}_{t-1}.$$

TABLE 1 and TABLE 2, set forth below, start with p(R)=10/1,700,000 and illustrate the above described principles. TABLE 1 shows iterative recall and precision values assuming that initially there are 1,700,000 documents of which only 10 are relevant. TABLE 1, however, does not take into account that documents are discrete. TABLE 2 shows revisions of TABLE 1 taking into account the discrete nature of the problem of document retrieval.

As shown in TABLE 2, it should be noted that, after the first iteration, Recall is 10/10 or 100.0%, but Precision is only 10/17,010 or 0.059%. After three iterations, Recall remains at 100.0%, and Precision has risen to 10/11 or 90.9%.

TABLE 1

Iterative Recall and Precision
Values assuming 10 relevant
documents out of 1,700,000

| t | Recall$_t$ | Precision$_t$ | Recall$_t$ + Precision$_t$ |
|---|---|---|---|
| 0 | 1.00000 | 0.00001 | 1.00001 |
| 1 | 0.99000 | 0.00058 | 0.99058 |
| 2 | 0.98010 | 0.05451 | 1.03461 |
| 3 | 0.97030 | 0.85092 | 1.82122 |
| 4 | 0.96060 | 0.99823 | 1.95883 |

TABLE 2

Revised version of TABLE 1
Taking into account discrete nature of the problem
$\#(D_t \cap R) = \text{round}(10 \text{ Recall}_t),$
$\#D_t = \text{round}(10 \text{ Recall}_t/\text{Precision}_t)$

| t | $\#(D_t \cap R)$ | $\#D_t$ | $\#(D_t \cap R)/10$ | $\#(D_t \cap R)/\#D_t$ |
|---|---|---|---|---|
| 0 | 10 | 1700000 | 1.0 | 0.00001 |
| 1 | 10 | 17010 | 1.0 | 0.00059 |
| 2 | 10 | 180 | 1.0 | 0.05556 |
| 3 | 10 | 11 | 1.0 | 0.90909 |
| 4 | 10 | 10 | 1.0 | 1.00000 |

A technical advantage of the present invention is the specification of a retrieval system that can receive a query and perform recursive retrieval automatically without human intervention. Recursion can be applied to many conventional base retrieval methods and improve them by doing so. In addition, different detection methods can be used at different iterations in the process. One embodiment of the present invention applies a retrieval process based upon a measure of the relevance between two documents generated by the process described in U.S. patent application Ser. No. 08/523,233, filed Sep. 5, 1995, also assigned to Electronic Data Systems, and entitled "System and Process for Determining Relevance Between Two Documents."

Bayesian document retrieval

One embodiment of the present invention uses a Bayesian document retrieval process which is described generally below. To explain such a system, x can be defined to be the feature vector for a query document. (It should be assumed that x remains fixed throughout the following discussion.) Similarly, y can be defined to be the feature vector for a document stored in a document repository. The problem created by document retrieval is to decide whether or not document y should be detected as being relevant to query x.

With respect to this task, let D be defined to be the event that document y is detected (and retrieved) as relevant to query x. On the other hand, let ¬D be defined to be the complement of that event. The event R can be defined to be the event that document y is relevant to query x, and ¬R can be defined to be its complement.

Generally, a document retrieval system is judged by two properties: recall and precision. Recall can be defined as the probability that a relevant document is detected, that is, p(D|R). Precision can be defined as the probability that a detected document is relevant, p(R|D). Recall measures whether or not the retrieval system is able to detect relevant documents. Precision measures whether or not the system detects only relevant documents. It should be understood that both are desirable characteristics for a document retrieval system.

However, the goals of good recall and good precision are at odds with one another. For example, a retrieval system could get high recall by identifying all documents stored in the repository as relevant, but then the precision would be very poor. On the other hand, precision might be kept high by retrieving very few documents, but then recall might be poor.

For a given query, the relative merits of recall and precision can be incorporated in a utility function. This utility function can be determined by four factors:

(1) $u(D,R)$, the utility of detecting a relevant document, that is, the value of good recall;

(2) $-u(\neg D,R)$, the penalty for not detecting a relevant document, that is, the price of poor recall;

(3) $u(\neg D, \neg R)$, the utility for not detecting an irrelevant document, that is, the value of good precision; and (4) $-u(D, \neg R)$, the penalty for detecting an irrelevant document, that is, the price of poor precision.

The posterior expected utility for the two possibilities D and $\neg D$ can be calculated for use in making a decision whether or not to detect a document. The posterior expected utility for making decision D can be defined as:

$$\bar{u}(D|y,x) = u(D,R)p(R|y,x) + u(D,\neg R)p(\neg R|y,x)$$

and the posterior expected utility for making decision $\neg D$ can be defined as:

$$\bar{u}(\neg D|y,x) = u(\neg D,R)p(R|y,x) + u(\neg D,\neg R)p(\neg R|y,x).$$

Using these definitions, the decision rule:

if $\bar{u}(D|y,x) \geq \bar{u}(\neg D|y,x)$ make decision D, otherwise make decision $\neg D$ maximizes posterior expected utility. This decision rule can be re-expressed as set forth below.
Make decision D if $$\log\left[\frac{p(R|y,x)}{p(\neg R|y,x)}\right] \geq \log\left[\frac{u(\neg D,\neg R) - u(D,\neg R)}{u(D,R) - u(\neg D,R)}\right];$$

otherwise, make decision $\neg D$. Because:

$$\log\left[\frac{p(R|y,x)}{p(\neg R|y,x)}\right] = \log\left[\frac{p(R|x)}{p(\neg R|x)}\right] + \log\left[\frac{p(y|R,x)}{p(y|\neg R,x)}\right],$$

the above inequality can be re-written as follows:

$$\log\left[\frac{p(y|R,x)}{p(y|\neg R,x)}\right] \geq \log\left[\frac{u(\neg D,R) - u(D,\neg R)}{u(D,R) - u(\neg D,R)}\right] - \log\left[\frac{p(R|x)}{p(\neg R|x)}\right].$$

It should be noted that the right hand side of this equation does not depend on y. In addition, the left hand side of this equation comprises the log likelihood ratio that y is relevant to x. U.S. patent application Ser. No. 08/523,233, entitled "System and Process for Determining Relevance Between Two Documents", which has referenced above, describes a process for calculating the log likelihood ratio:

$$b(y|x) = \log\left[\frac{p(y|R,x)}{p(y|\neg R,x)}\right]$$

Statistical process for determining relevance

The following discussion describes in general the determination of a relevance measure for the relevance between two documents for use in a document retrieval system. In this discussion, it is assumed the query and the document contain natural language text. However, this approach could be applied to documents containing text, audio, image, video, or other information as long as appropriate feature vectors could be defined.

With respect to text documents, the feature vector can be defined as follows. A dictionary of J content words indexed by $j=1, \ldots, J$ can be defined. These words would likely include nouns and verbs but not function words like prepositions and helping verbs. Other common words might be eliminated as well. Often this list could be a subset of the set of all sequences of white-space delimited ASCII characters that occur in documents in a given repository of documents. From this list of all "words", the words on a kill list can be eliminated. Although not discussed herein, it would be possible to base the feature vector on more elaborate natural language methods and use syntactic constructs such as noun-phrases if it proved worthwhile to do so.

The term $x_j$ can be defined to be the number of times that word j occurs in the query, and X can be defined to be the number of unfiltered words in the query (note that $\Sigma_j x_j \leq X$). The term $y_j$ can be defined to be the number of times that word j occurs in the document, and Y can be defined to be the number of unfiltered words in the document. The vector $x=(x_1, \ldots, x_J)'$ can be the vector of query word counts, and the vector $y=(y_1, \ldots, y_J)'$ can be the vector of document word counts. (It is assumed for discussion that the unfiltered word counts X and Y are fixed.)

In order to calculate the log likelihood ratio $b(y|x)$ for the query and a document, the two likelihoods $p(y|R,x)$ and $p(y|\neg R,x)$ need to be determined. As taught by the disclosure of U.S. patent application Ser. No. 08/523,233, it can be assumed in either case (i.e., given either R or $\neg R$) that $y_1, \ldots, y_J$ are independent and that, conditional on the underlying rate parameter $\lambda_j^y$ for word j in document y, the observed word count $y_j$ is an observation from a Poisson process with mean $\lambda_j^y Y$. In other words, the following can be assumed:

$$y_j|\lambda_j^y \sim Pois(\lambda_j^y Y),$$

independently for $j=1, \ldots, J$, where the notation $w \sim Pois(\alpha)$ indicates that the probability distribution for a random variable w is:

$$p(w) = \frac{\alpha^w \exp(-\alpha)}{w!},$$

for $w=0,1,2,\ldots$

If $\neg R$ is true (that is, the document is not relevant), as taught by the disclosure of U.S. patent application Ser. No. 08/523,233, it can be assumed that the word rate $\lambda_j^y$ is randomly drawn from an underlying gamma distribution with parameters $\omega_j$ and $1/\Omega_j$. In other words, the following can be assumed:

$$\lambda_j^y|\neg R,x \sim Gam(\omega_j, 1/\Omega_j),$$

where the notation $w \sim Gam(\alpha, \beta)$ indicates that the probability density for a random variable w is:

$$p(w) = \frac{w^{\alpha-1} \exp(-w/\beta)}{\Gamma(\alpha)\beta^\alpha},$$

for $0 \leq w < \infty$. It should be noted that this distribution for $\lambda_j^y$ assumes that, given $\neg R$, the word rates for the document $\lambda_j^y$ and the query $\lambda_j^x$ are independent of each other.

Given $\neg R$ and $x_j$, the document word count $y_j$ has a negative binomial distribution:

$$y_j|\neg R,x_j \sim NB\{\omega_j, Y/(\Omega_j+X)\},$$

The notation $w \sim NB(\alpha, \beta)$ indicates that a random variable w has probability distribution:

$$p(w) = \frac{\Gamma(y+\alpha)}{y!\Gamma(\alpha)} \beta^w (1-\beta)^\alpha,$$

for $w=0,1,2,\ldots$

On the other hand, if R is true (i.e., the document is relevant), as taught by the disclosure of U.S. patent application Ser. No. 08/523,233, it can be assumed that $\lambda_j^y$ is randomly drawn from an updated gamma distribution:

$$\lambda_j^y | R, x_j \sim \text{Gam}\{\omega_j + x_j, 1/(\omega_j + X)\}.$$

This distribution for $\lambda_j^y$ assumes that, given R, the word rates for the document and the query are equal, that is, $\lambda_j^y = \lambda_j^x$. This uses the query data $(x_j, X)$ to update the prior distribution for $\lambda_j^x$, thus obtaining a posterior distribution for $\lambda_j^x$. This posterior distribution for $\lambda_j^x$ is an appropriate prior distribution for $\lambda_j^y$. It follows that:

$$y_j | R, x_j \sim NB\{\omega_j + x_j, Y/(\Omega_j + X + Y)\}.$$

As a result of these assumptions, the log likelihood ratio is:

$$b(y|x) = \sum_{j=1}^{J} b(y_j|x_j) =$$

$$\sum_{j=1}^{J} f(y_j; \omega_j + x_j, Y/(\Omega_j + X + Y)) - f(y_j; \omega_j, Y/(\Omega_j + Y))$$

where the function $f()$ is defined to be:

$$f(w; \alpha, \beta) = \log\Gamma(\alpha+w) - \log\Gamma(\alpha) - \log\Gamma(w+1) + w\log(\beta) + \alpha\log(1-\beta),$$

which is the log probability for a negative binomial random variable.

It should be noted that the processing for a given query involves a term for each word in the defined dictionary, not just those in the query, or those in the query or the document. Consequently, this process can be more computationally intensive than conventional inverted file methods.

The log likelihood ratio for document (y,Y) given the query (x,X) is the same if the two roles are reversed, that is, if (x,X) is treated as the document and (y,Y) is treated as the query. This property is intuitively appealing: it seems reasonable that the query should be as relevant to the document as the document is to the query.

To derive this result, note that:

$$\exp[b(y_j|x_j)] = \frac{\int p(y_j|\lambda_j)p(\lambda_j|R, x_j)d\lambda_j}{\int p(y_j|\lambda_j|\neg R)d\lambda_j} =$$

$$\int p(y_j|\lambda_j) \left\{ \frac{p(x_j|\lambda_j)p(\lambda_j)}{\int p(x_j|\lambda_j)p(\lambda_j)d\lambda_j} \right\} d\lambda_j \div \int p(y_j|\lambda_j)p(\lambda_j)d\lambda_j =$$

$$\frac{\int p(x_j|\lambda_j)p(y_j|\lambda_j)p(\lambda_j)d\lambda_j}{\left[\int p(x_j|\lambda_j)p(\lambda_j)d\lambda_j\right]\left[\int p(y_j|\lambda_j)p(\lambda_j)d\lambda_j\right]} = \frac{p(x_j, y_j)}{p(x_j)p(y_j)}.$$

From this it can be seen that:

$$b(y|x) = b(x|y)$$

Process for estimating the hyperparameters

In the above discussion, it was assumed that hyperparameters $\theta_j = (\omega_j, \Omega_j)$, $j=1, \ldots, J$, were known. In practice, an empirical Bayesian process can be applied to a training set to estimate the $\theta_j$'s. In particular, for each $j=1, \ldots, J$, to estimate $\theta_j(\omega_j, \Omega_j)$, the availability of training data $\{(z_j^1, Z^1), \ldots, (z_j^i, Z^i)\}, \ldots, (z_j^k, Z^k)\}$ can be assumed, where $z_j^i$ is the number of times word j occurs in the $Z^i$ unfiltered words of training document i. The vector $z_j(Z_j^1, \ldots, z_j^k)'$. (The $Z^i$'s are assumed fixed throughout the remainder of this discussion.)

The elements of $z_j$ can be assumed to be independent given the true rates $\lambda_j^i$ with Poisson distribution. In other words, $$z_j^i|\lambda_j^i \sim \text{Pois}(\lambda_j^i Z^i)$$

independently for $i=1, \ldots, k$.

The true rates $\lambda_j^1, \ldots, \lambda_j^k$ can be assumed to be a random sample from a $\text{Gam}(\omega_j, 1/\Omega_j)$ distribution. Hence, the marginal distribution of $z_j$ is:

$$z_j^i|\theta_j \sim NB\{\omega_j, Z^i/(\Omega_j + Z^i)\}$$

independently for $i=1, \ldots, k$.

Furthermore, it can be assumed that, before observing $z_j$, the hyperparameter $\theta_j$ has a (hyperprior) distribution $p(\theta_j)$. After observing $z_j$, the hyperparameter $\theta_j$ has distribution:

$$p(\theta_j|z_j) = \frac{p(z_j|\theta_j)p(\theta_j)}{p(z_j)}.$$

If k is reasonably large, then $p(\theta_j|z_j) \approx \delta_{\hat{\theta}_j}(\theta_j)$, where $\hat{\theta}_j$ is the maximum likelihood estimate of $\theta_j$ based on $z_j$. In other words, it is suitable to assume that $\theta_j$ is known.

Consequently, after observing $z_j$ the rate parameter $\lambda_j$ has distribution:

$$p(\lambda_j|z_j) = \int\int p(\lambda_j|\omega_j,\Omega_j)p(\omega_j,\Omega_j|z_j)d\omega_j d\Omega_j,$$

where:

$$\lambda_j|\omega_j, \Omega_j \sim \text{Gam}(\omega_j, 1/\Omega_j)$$

Also, $p(\omega_j, \Omega_j|z_j)$ is the posterior distribution for $\theta_j$ given the training data $z_j$.

If j is reasonably large, then it can be assumed that:

$$\lambda_j|z_j \sim \text{Gam}(\hat{\omega}_j, 1/\hat{\Omega}_j).$$

This distribution can then be used to replace $p(\lambda_j)$ in the earlier described process.

Recursive Retrieval System Development Tool

Figure 3:
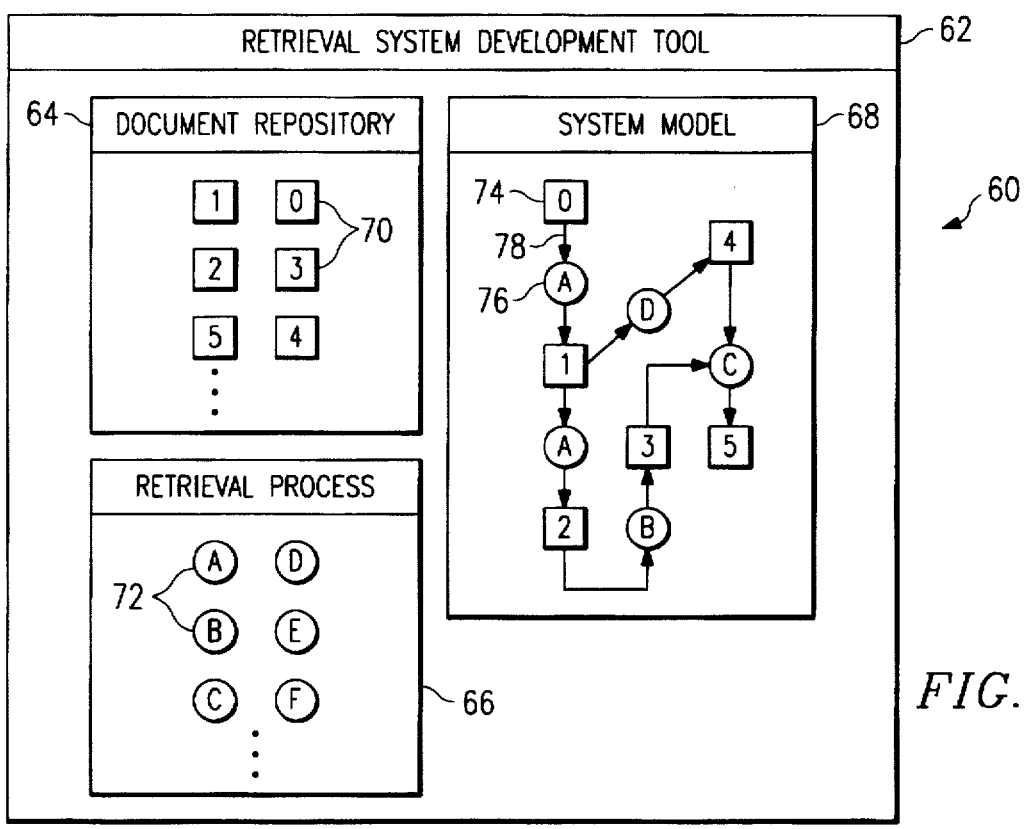
FIG. 3 is a schematic diagram of a recursive retrieval system development tool according to the teachings of the present invention.

FIG. 3 is a schematic diagram of a recursive retrieval system development tool, indicated generally at 60, according to the teachings of the present invention. Development tool 60 comprises a development window 62. Development window 62 comprises a document repository window 64 and a retrieval process window 66. A system model window 68 represents a recursive retrieval system constructed using development tool 60.

Document repository window 64 displays a plurality of individual document repositories 70. The repository labeled "0" comprises an original document repository, and the other repositories labeled "1, 2, 3, 4, and 5" represent those produced at each iteration from a previously existing repository. Retrieval process window 66 displays a plurality of individual retrieval processes 72 labeled "A, B, C, D, E and F". Each retrieval process 72 comprises a process that can be applied to a document repository to produce a new repository comprising a set of retrieved documents. As shown in system model window 68, each document repository 74 in the model can be linked to a retrieval process 76 by a process step 78.

System model window 68 can be used by a user to construct a model of a recursive retrieval system. The user can select a retrieval process 72 to link to original document repository "0". As shown, retrieval process "A" was chosen. Retrieval process "A" can then be defined by the user with respect to the desired processing of repository "0".

System model window 68 represents the resulting document repository from this first iteration as document repository "1". As shown, document repository "1" is modeled to be processed by two retrieval processes: "A" and "D". It should be understood that the second iteration that uses retrieval process "A" can be defined differently because a different repository is processed and parameters can be modified by the user.

Document repositories "2" and "4" represent the documents retrieved as a product of processing by the two iterative steps using processes "A" and "D". System model window 68 represents this new document repository "2" as being processed by retrieval process "B" to produce document repository "3". Document repository "3" and document repository "4" are then modeled to be processed by retrieval process "C" to produce document repository "5". Thus, system model window 68 represents a recursive retrieval system constructed to process document repository "0" to produce document repository "5" using the defined iterations. This modeled automatic recursive retrieval system, as fully defined using development tool 60, can then be implemented to allow automatic recursive retrieval of documents from repository "0".

Figure 4:
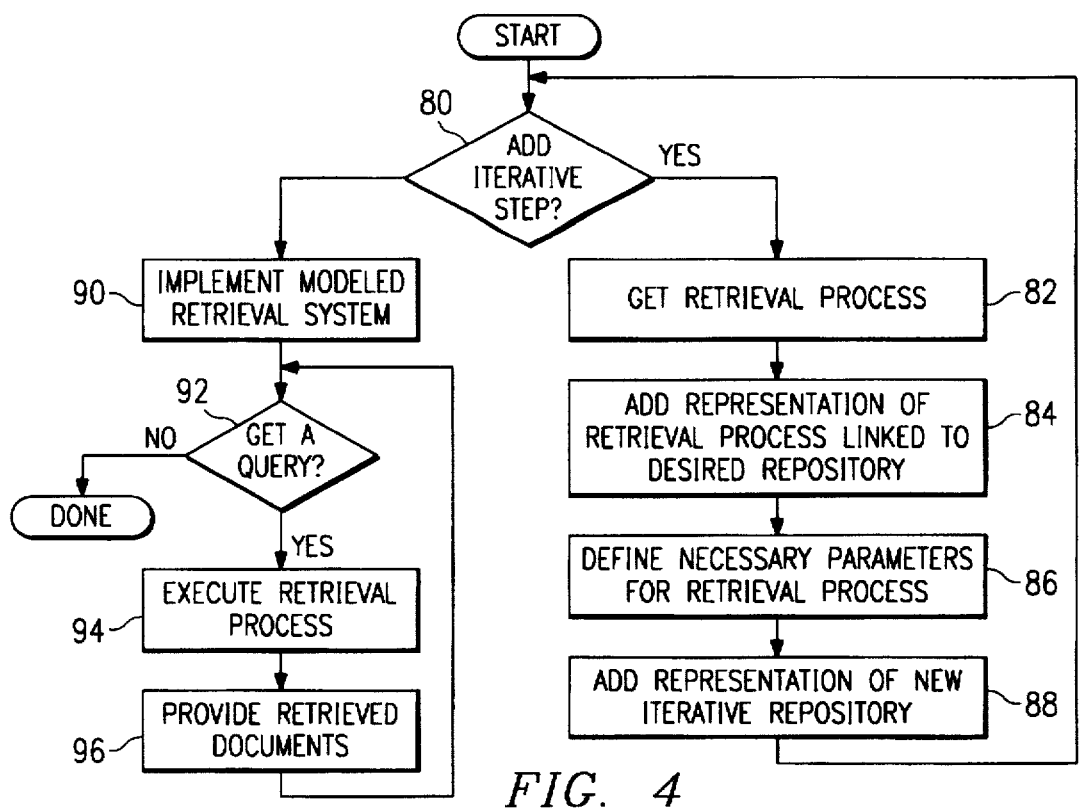
FIG. 4 is a flow chart of a process for modeling, implementing and using a recursive retrieval system according to the teachings of the present invention.

FIG. 4 is a flow chart of a process for modeling, implementing and using a recursive retrieval system according to the teachings of the present invention. As shown, step 80 comprises determining whether an iterative step is to be added. If so, the retrieval process for that step is selected in step 82. In step 84, a representation of the selected retrieval process is added to the system model and linked to the desired repository. The necessary parameters for the selected retrieval process are then defined in step 86. After definition of the parameters, in step 88, a representation of the new iterative repository produced by the added retrieval process is added to the system model. The process then returns to step 80 to determine whether an additional iterative step is to be added. If so, steps 82, 84, 86 and 88 are repeated as described.

If, in step 80, an iterative step is not to be added, then the definition of the recursive retrieval system is complete. In step 90, the modeled recursive retrieval system is implemented as an automatic recursive retrieval system. This implementation can comprise creating a software application for execution on a computer system. In step 92, a decision is made whether to get a query to be applied against an original repository according to the implemented retrieval system. If so, the recursive retrieval system, as implemented in step 90, is executed in step 94 using the query. In step 96, the retrieved documents identified by the automatic recursive retrieval system using the original repository and the query are provided as system output to a user.

Although the present invention has been described in detail, it should be understood that various changes, substitutions and alterations can be made hereto without departing from the spirit and scope of the invention as defined by the independent claims.

What is claimed is:

1. A system for recursive document retrieval, comprising:
    an original repository comprising a plurality of documents;
    a retrieval engine coupled to the original repository and receiving a query, the retrieval engine operable:
        to execute an automatic recursive retrieval process with respect to the original repository using the query, the automatic recursive retrieval process comprising a plurality of iterations; and
        to provide as system output a retrieved repository comprising a plurality of documents from the original repository identified as sufficiently relevant to the query according to the automatic recursive retrieval process for detection as relevant documents;
    wherein the plurality of iterations comprises a first iteration performing a retrieval process on the original repository to generate an iterative repository and subsequent iterations performing retrieval processes on iterative repositories generated by previous iterations to generate additional iterative repositories; and
    wherein the retrieved repository is one of the additional iterative repositories.

2. The system of claim 1, wherein the automatic retrieval process comprises an iteration that uses a Bayesian retrieval process.

3. The system of claim 2, wherein the Bayesian retrieval process uses a relevance measure between documents based upon a log-likelihood ratio generated by assuming that if the document is not relevant, the parameters of a sampling distribution can be drawn from an underlying distribution and if the document is relevant, the parameters of the sampling distribution can be drawn from an updated distribution.

4. The system of claim 3, wherein the original repository comprises documents that each comprise text information and the query comprises text information and wherein the parameters of the sampling distribution comprise word rates.

5. The system of claim 1, wherein the automatic recursive retrieval process comprises iterations that use different types of retrieval processes.

6. The system of claim 1, wherein the system is implemented using a computer system having a storage device, memory and a processor.

7. A process for recursive document retrieval, comprising:
    providing an original repository comprising a plurality of documents;
    executing an automatic recursive retrieval process with respect to the original repository using a query, the automatic recursive retrieval process comprising a plurality of iterations including:
        performing, in a first iteration, a retrieval process on the original repository to generate an iterative repository; and
        performing, in subsequent iterations, retrieval processes on iterative repositories generated by previous iterations to generate additional iterative repositories; and
    providing as system output a retrieved repository comprising a plurality of documents from the original repository identified as sufficiently relevant to the query for detection as relevant documents, wherein the retrieved repository is one of the additional iterative repositories.

8. The process of claim 7, wherein executing an automatic recursive retrieval process comprises executing an iteration that uses a Bayesian retrieval process.

9. The process of claim 8, wherein executing an iteration that uses a Bayesian retrieval process comprises performing a Bayesian retrieval process that uses a relevance measure between documents based upon a log-likelihood ratio generated by assuming that if the document is not relevant, the parameters of a sampling distribution can be drawn from an underlying distribution and if the document is relevant, the parameters of the sampling distribution can be drawn from an updated distribution.

10. The process of claim 9, wherein providing an original repository comprises providing an original repository comprising documents that each comprise text information and wherein providing a query comprises providing a query comprising text information and wherein the parameters of the sampling distribution comprise word rates.

11. The process of claim 7, wherein executing an automatic recursive retrieval process comprises performing iterations that use different types of retrieval processes.

12. The process of claim 7, wherein the process is accomplished using a computer system having a storage device, memory and a processor.

13. A process for constructing an automatic recursive document retrieval system, comprising:

providing a representation of an original document repository;

providing a representation of a plurality of retrieval processes;

linking a first selected retrieval process from the plurality of retrieval processes to the original repository;

getting parameters for the first retrieval process;

creating a representation of a first iterative repository produced by the first retrieval process; and repeating linking, getting and creating for additional selected retrieval processes and iterative repositories in order to construct a model of the automatic recursive retrieval system.

14. The process of claim 13, further comprising implementing the automatic recursive retrieval system based upon the model.

15. The process of claim 14, further comprising receiving a query and executing the automatic recursive retrieval system to identify and provide retrieved documents as process output.

16. The process of claim 13, wherein providing a representation of a plurality of retrieval processes comprises providing a representation of a Bayesian retrieval process.

17. The process of claim 16, wherein providing a representation of a Bayesian retrieval process comprises providing a representation of a Bayesian retrieval process that uses a relevance measure between documents based upon a log-likelihood ratio generated by assuming that if the document is not relevant, the parameters of a sampling distribution can be drawn from an underlying distribution and if the document is relevant, the parameters of the sampling distribution can be drawn from an updated distribution.

18. The process of claim 17, wherein the parameters of the sampling distribution comprise word rates.

19. The process of claim 13, wherein the process is accomplished using a computer system having a storage device, memory and a processor.

* * * * *